United States Patent [19]
Toda et al.

[11] 3,942,494
[45] Mar. 9, 1976

[54] FUEL SUPPLY SYSTEM FOR INTERNAL COMBUSTION ENGINE

[75] Inventors: Tadahide Toda; Takashi Kato, both of Susono, Japan

[73] Assignee: Toyota Jidosha Kogyo Kabushiki Kaisha, Toyota, Japan

[22] Filed: Dec. 3, 1973

[21] Appl. No.: 421,039

Related U.S. Application Data
[63] Continuation-in-part of Ser. No. 304,986, Nov. 9, 1972, abandoned.

[30] Foreign Application Priority Data
Feb. 1, 1972  Japan.............................. 47-10974

[52] U.S. Cl............ 123/119 R; 261/39 A; 261/34 B
[51] Int. Cl.² ......................................... F02M 7/00
[58] Field of Search................. 123/119 R, 122 A; 261/34 B, 39 A

[56] References Cited
UNITED STATES PATENTS

| | | | |
|---|---|---|---|
| 2,355,346 | 8/1944 | Weber | 261/34 B |
| 2,714,759 | 8/1955 | Von Wangenheim | 261/39 A |
| 2,949,103 | 8/1960 | Carlton | 123/122 A |
| 3,310,045 | 3/1967 | Bartholomew | 123/122 A |

*Primary Examiner*—Wendell E. Burns
*Assistant Examiner*—R. H. Lazarus
*Attorney, Agent, or Firm*—Stevens, Davis, Miller & Mosher

[57] ABSTRACT

A fuel supply system having a fuel source, a nozzle disposed in an intake system of an internal combustion engine for injecting additional fuel into the intake system, a fuel pipe connected to the fuel source and the nozzle, an accelerating compensator responsive to the engine accelerator for feeding additional fuel from the fuel source to the intake system through the fuel pipe and the nozzle, a temperature sensing device for sensing temperature of the engine, and a controlling device responsive to engine temperature for controlling the volume of fuel fed by the acceleration compensator, the volume of fuel fed by the compensator being decreased as engine temperature increases.

16 Claims, 6 Drawing Figures

FUEL SUPPLY SYSTEM FOR INTERNAL COMBUSTION ENGINE

BACKGROUND OF THE INVENTION

The present invention relates to a fuel system for an internal combustion engine. More particularly, it relates to a system for supplying a supplementary volume of fuel to an engine at the time of its acceleration. This application is a continuation-in-part of our copending application Ser. No. 304,986 filed Nov. 9, 1972, now abandoned.

With rapid spread of automobiles in recent years, air pollution due to exhaust gas from automobiles has become a serious smog problem in urban areas. In order to cope with such a situation, control of exhaust gas is being enforced by law in many countries of the world. Consequently, development of means for preventing the discharge of gases containing noxious components has been strongly promoted. It has been confirmed that the volume of noxious components, especially CO (carbon monoxide) and HC (hydrocarbons) contained in the exhaust gas of an internal combustion engine depends upon the fuel-air ratio of the mixture introduced into the engine and that they can be effectively eliminated by using a lean mixture. When the mixture is lean, there is no problem with engine performance as long as the engine is sufficiently warmed up. However, if the engine is cold, troubles such as backfiring or engine stalling may be caused at the time of acceleration because the fuel cannot be evaporated at a satisfactory rate.

Conventional fuel systems are provided with a slow system for meeting the condition of very low load such as idling, a main system for making up an economical mixture required for normal travelling and a power system for enriching the mixture at the time of acceleration, an acceleration system for compensating for the delay of fuel supply by using an accelerator pump at the time of acceleration and a choke system for enriching the mixture when engine temperature is low. Furthermore, conventional fuel systems comprise various different means for meeting an unsteady state of travel.

However, no special consideration has been given to acceleration under the condition where a vehicle is travelling before the engine has sufficiently warmed up. For remedying engine troubles in such cases, means are provided to make the fuel air ratio to be set at the main system slightly richer than that required by the engine which is fully warmed up. Therefore, if the engine is fully warmed up, the fuel will be delivered in slight excess over that required for good performance, thus resulting in an increase in fuel cost as well as an increase in the amount of CO and HC in the exhaust gas.

Therefore, it is desirable to enrich the fuel-air mixture introduced into the engine only at the time of acceleration before the engine has warmed up.

SUMMARY OF THE INVENTION

This invention eliminates the above-described drawbacks encountered with the prior art devices at the time of engine acceleration and provides a means for introducing additional fuel only at the time of acceleration.

An object of the invention is to provide a fuel supply system for an internal combustion engine which permits supplying an extra supply of fuel to the engine at the time of acceleration while the engine is insufficiently warmed up to avoid stalling, backfiring and similar malfunctions.

Other objects and features of the invention will be apparent from the description of preferred embodiments thereof with reference to accompanying drawings.

In accordance with the invention, a fuel supply system has a fuel source, a nozzle disposed in an intake system such as a venturi tube of a carburetor or an intake manifold, a fuel pipe connected to the fuel source and the nozzle, an acceleration compensator responsive to engine acceleration for feeding additional fuel from the fuel source to the intake system, a temperature sensing device for sensing engine temperature and a controlling device responsive to the engine temperature for controlling the volume of the feeding fuel.

DESCRIPTION OF THE PREFERRED EMBODIMENTS

Figure 1:
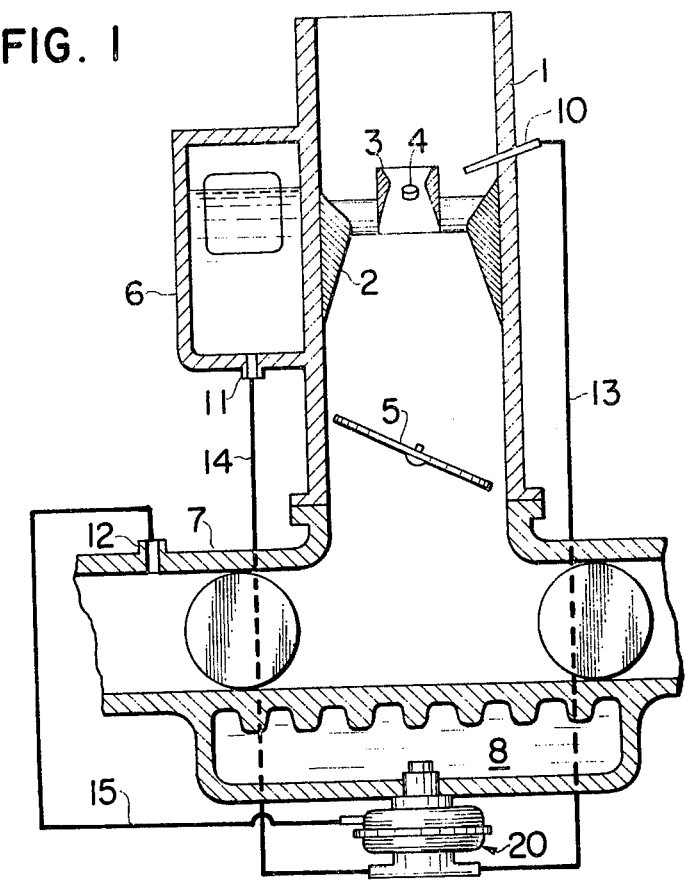
FIG. 1 is a schematic diagram of a fuel system comprising an embodiment of this invention.

Referring now to FIG. 1, in a carburetor of any known type, a venturi tube 1 is provided with a large venturi 2, a small venturi 3, a fuel main nozzle 4 connected to a float bowl 6 by a fuel passage (not shown) and a throttle valve 5. Thus, a main fuel supply system is defined so that fuel from float bowl 6 is supplied through main nozzle 4 into a small venturi 3. Furthermore, an intake manifold 7 is connected to the discharge side of venturi tube 1. Manifold 7 may be provided with means of any known type for heating fuel-air mixture flowing therethrough. Either the engine cooling water or the engine exhaust gas may be utilized for such heating. The manifold 7 illustrated in the drawing has a water jacket 8 at the outside thereof, into which the engine cooling water whose temperature rises in accordance with the warming up condition of the engine is admitted to heat manifold 7. Thus, fuel-air mixture is heated while it flows through manifold 7.

When the engine is accelerated while the engine has not yet warmed up, additional fuel is supplied to enrich the fuel-air mixture by means of an acceleration compensator 20 from the float bowl 6 to venturi tube 1 through fuel pipe 14, fuel basin 34 which is a part of compensator 20, fuel pipe 13 and nozzle 10.

Figure 2:
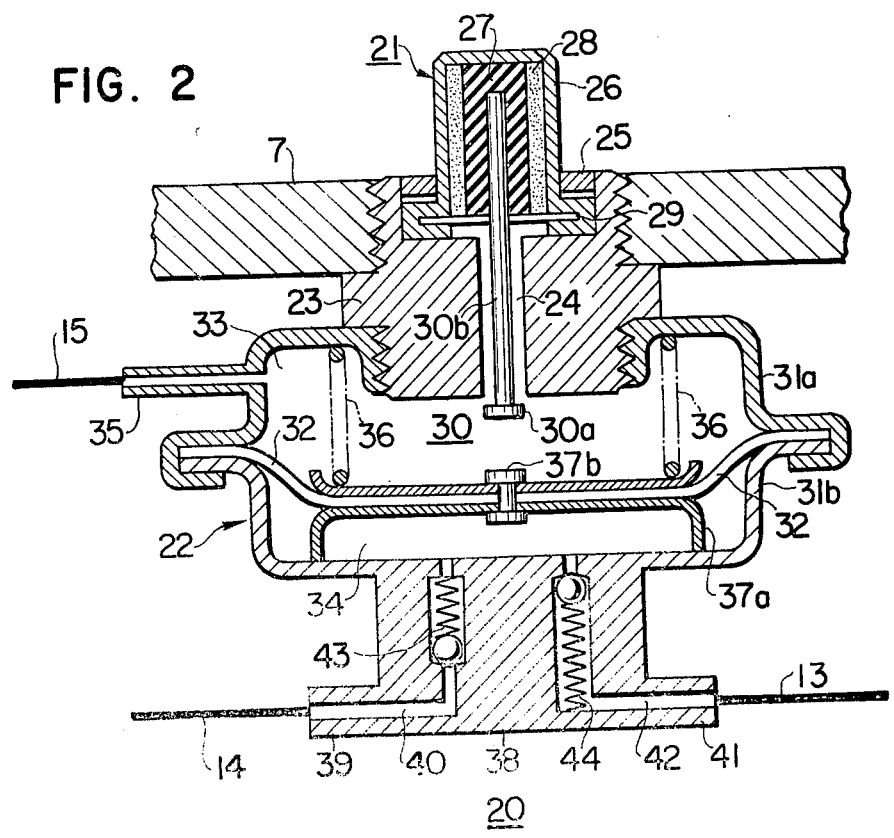
FIG. 2 is a cross-sectional view of an acceleration compensator, a temperature sensing means, and controlling means shown in FIG. 1.

The fuel system is described in more detail referring to FIG. 2, which shows a condition when the engine is not warmed up.

Compensator 20 has valve members 38 which are normally closed and operating means 22 responsive to the engine acceleration to open valve members 38 to pump fuel to venturi tube 1.

Operating means 22 comprises a diaphragm chamber which is defined by casing 31a, 31b, a diaphragm 32 which is positioned in the diaphragm chamber and biased by a return spring 36 toward the position where an inverted cylindrical stop member 37a secured to diaphragm 32 is in contact with casing 31b. A vacuum chamber 33, which is defined by casing 31a and diaphragm 32, is connected to intake manifold 7 through a pipe 15 which extends from an inlet 35 of casing 31a to a port 12 disposed in a wall of intake manifold 7. A fuel basin 34, which is defined by casing 31b and diaphragm 32, is connected to float bowl 6 through fuel pipe 14 and inlet passage 40, and to venturi tube 1 through outlet passage 42, fuel pipe 13 and nozzle 10.

Valve members 38 comprise check valve 43, 44 which are disposed in passages 40, 42 respectively. Check valve 43 is designed to permit only inflow of fuel from float bowl 6 to fuel basin 34 when the volume of the fuel basin 34 increases because of deflection of diaphragm 32. Check valve 44 is designed to permit only outflow from fuel basin 34 to venturi tube 1 when the volume of fuel basin 34 decreases.

Thus, in operating means 22, diaphragm 32 is biased by means of return spring 36 to the lowermost position to decrease the volume of fuel basin 34 when the manifold vacuum in vacuum chamber 33 is low. When the manifold vacuum exceeds the predetermined value at the time of cruising under the condition of low engine temperature, diaphragm 32 is deflected upward, overcoming the force of return spring 36, until it is brought into contact with a shaft end 30a, which constitutes a part of controlling means 30, thus increasing the volume of the fuel basin 34. Consequently, check valve 43 opens the inlet passage 40 to admit fuel into fuel basin 34. Then, when the manifold vacuum is decreased at the time of acceleration, return spring 36 causes diaphragm 32 to deflect downward. Thus, check valve 43 closes inlet passage 40 and another check valve 44 opens outlet passage 42 to inject fuel from fuel basin 34 through fuel pipe 13 and nozzle 10 into tube 1.

On the other hand, when the engine is warmed up fully, shaft end 30a is pushed down by means of the thermal expansion of wax 28 which constitute a part of temperature sensing means 21. Accordingly, the range where the diaphragm can move becomes narrow, and finally reaches the stage where shaft end 30a is in contact with a flanged stop member 37b secured to diaphragm 32. At the same time, stop 37a is in contact with casing 31b. Then, even if the manifold vacuum is increased, diaphragm 32 is restrained and no additional fuel is supplied to venturi tube 1.

The structures of temperature sensing means 21 and of controlling means 30 are now described. An inverted cup-shaped casing 26 of temperature sensing means is installed at one side of stepped hole 24 by means of a clamp 25 in an exposed manner so that it is brought into contact with the engine cooling water in water jacket 8 as shown in FIG. 1. An elastic member 27 made of shrinkable rubber or the like is slidably inserted in case 26. Wax 28 is interposed between case 26 and elastic member 27. The wax 28 melts and expands when heated to a predetermined temperature, thus compressing the elastic member 27. Elastic member 27 and wax 28 are sealed in case 26 by means of a retaining ring 29. Furthermore, a shaft 30b, which constitutes a part of controlling means 30, is inserted in elastic member 27 and extends through ring 29 and bore 24 into vacuum chamber 33 so that it is pushed out in response to the elastic member 27. Thus, when the temperature of the engine cooling water is low and the engine warming up is not sufficient, wax 28 of temperature sensing means 21 congeals and elastic member 27 expands to its maximum volume. On the other hand, when the temperature of the engine cooling water is increased and the engine warming up reaches the predetermined value, wax 28 melts and elastic member 27 is compressed to decrease the volume thereof due to the thermal expansion of wax 28. Then shaft 30b is moved by the contraction of elastic member 27 conforming to the engine warming up condition. As the result, shaft end 30a of shaft 30b is brought into direct contact with stop 37b carried by diaphragm 32 which is under the condition where stop 37a is in contact with casing 31b. Thus, changes in the volume of the fuel basin 34 do not take place anymore, thereby fuel discharge is stopped, regardless of the degree of the manifold vacuum.

By virtue of the above-described construction of the fuel system, acceleration compensator 20 is operated in accordance with the changes in the manifold vacuum of intake manifold 7 at the time of acceleration when the engine is not warmed up sufficiently. Thus, the additional fuel is delivered from the nozzle 10 to venturi tube 1. When the engine is sufficiently warmed up and the possibility of engine trouble is eliminated, acceleration compensator 20 stops actuation and, therefore, the additional fuel is not fed at all.

Figure 3:
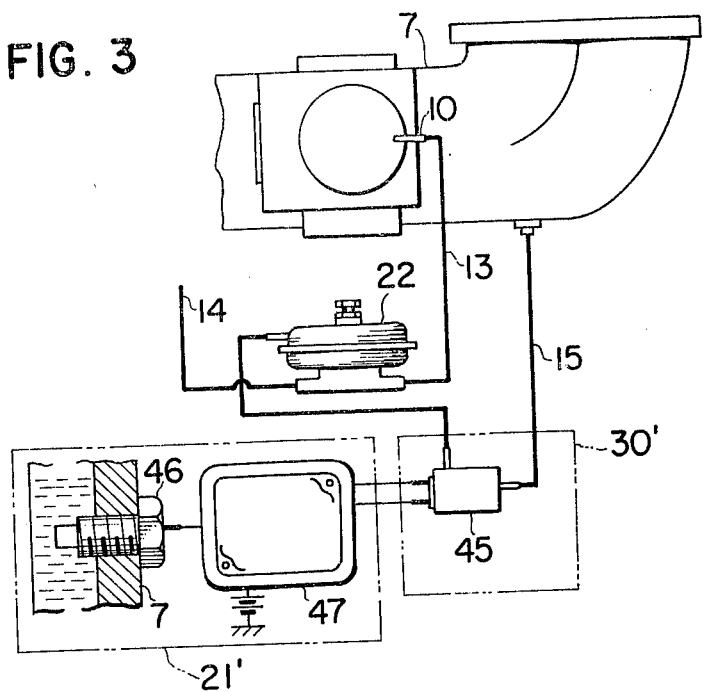
FIG. 3 is a schematic diagram of another embodiment of the invention.
Figure 4:
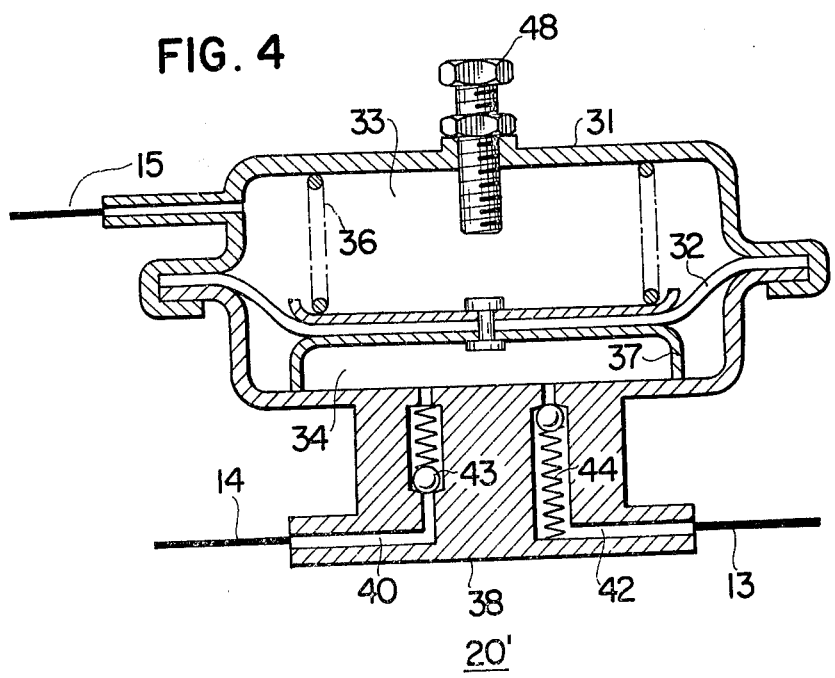
FIG. 4 is a cross-sectional view of an acceleration compensator of the embodiment shown in FIG. 3.

The embodiment of the fuel system illustrated in FIG. 3 of the drawings has a nozzle 10 installed in an intake manifold 7. An acceleration compensator comprises an operating means 20', a temperature sensing means 21' and a control means 30' which is herein defined by an electromagnetic valve 45. Electromagnetic valve 45 is provided on a pipe line 15 designed to admit the manifold vacuum into a vacuum chamber 36 of operating means 20'. As shown in FIG. 4 in detail, temperature sensing means 21' comprises a temperature detector 46 installed in a wall of water jacket 8 in the same manner as described hereinbefore and an electronic judging device 47 connected to temperature detector 46 through an electric connection. Temperature detector 46 is designed to sense the temperature of the engine cooling water and to send a signal representing the warming-up condition to electronic judging device 47. Electronic judging device 47 in turn generates a signal upon judgement or evaluation of said electric signals when the engine warming up is not sufficient and causes electromagnetic valve 45 to open pipe line 15. If the engine warming up is sufficient, electronic judging device 47 does not emit any signal and causes electromagentic valve 45 to close pipe line 15. Vacuum chamber 33 is provided with a screw 48 for adjusting the fuel discharge by adjusting the deflection of the diaphragm 32. Other construction is the same as shown in FIG. 2. Thus, when the engine warming up is insufficient, pipe line 15 is opened by means of electromagnetic valve 45 and the manifold vacuum of intake manifold 7 is applied to diaphragm 32 of operating means 20'. As a result, the fuel in the float bowl 6 is injected from nozzle 10 into intake manifold 7 at the time of acceleration. When the engine warming up becomes sufficient, electromagnetic valve 45 closes pipe line 15, thereby stopping the action of operating means 20'.

The same effect can be had by replacing the installation of nozzle 10 in the first embodiment with intake manifold 7 and the installation of nozzle 10 in the second embodiment with venturi tube 1. It is also possible to install temperature sensing means 21 and 21' to sense the temperature of engine lubricating oil.

Figure 5:
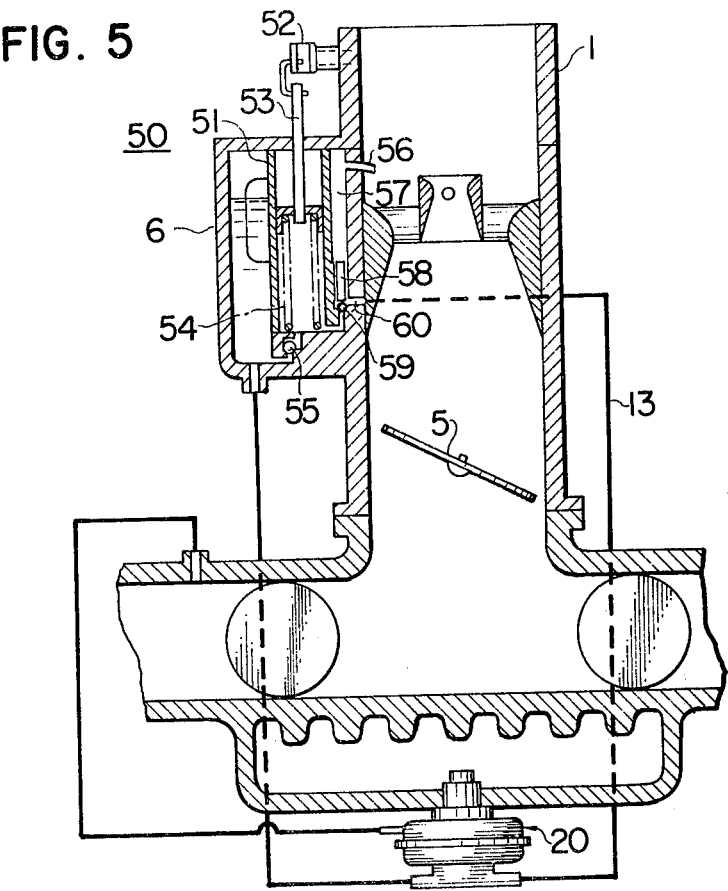
FIG. 5 is a schematic diagram of another embodiment of the invention.

Illustrated in FIG. 5 is an embodiment in which the fuel system according to this invention is installed by utilizing the fuel injection passage of the accelerator pump in the carburetor. Referring now to FIG. 5, a cylinder 51 of an accelerator pump 50 is formed at the float bowl 6 of the carburetor. A piston 53 has a cup-shaped member adjacent to one end thereof slidably disposed in cylinder 51. Back-up spring 54 is compressed between the cup-shaped member and the end of cylinder 51. Piston 53 is connected to throttle valve 5 through a lever 52. A check valve 55 for allowing fuel only to flow in the direction of cylinder 51 is provided between cylinder 51 and the float bowl 6. Thus, the fuel admitted into the cylinder 51 at the time when the accelerator pedal is depressed is injected by means of accelerator pump 50 into venturi tube 1 through fuel injection passage 57 and nozzle 56 as a result of the downward movement of piston 52 at the time when the accelerator pedal is depressed, thus enriching the mixture temporarily.

In fuel injection passage 57 of accelerator pump 50 of the above construction, the fuel system according to this invention connects the pipe line 13 coming from acceleration compensator 20 by providing an inlet port 60 at the discharge side of check valve 59, thereby delivering the auxiliary fuel from the acceleration compensator 20 into the venturi tube 1 through fuel injection passage 57 and nozzle 56 of the accelerator pump 50 at the time of acceleration when the engine is not warmed up sufficiently.

Figure 6:
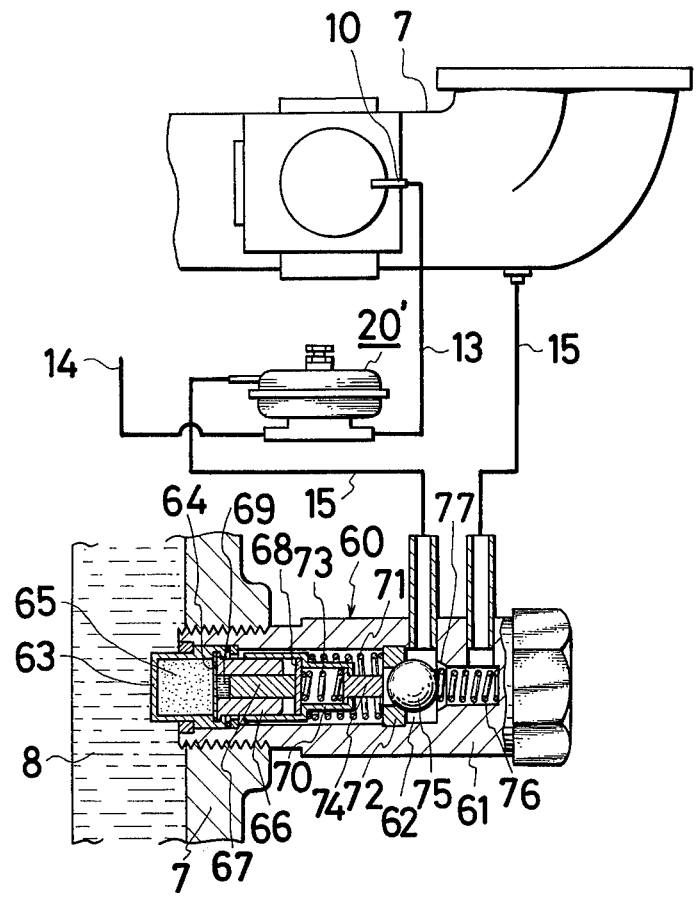
FIG. 6 is a schematic diagram of still another embodiment of the invention.

A modification of the fuel system shown in FIG. 3 is illustrated in FIG. 6 in which the supply of the manifold vacuum through a pipe line 15 to an acceleration compensator 20' having the same construction as in FIG. 4 is controlled by a temperature responsive valve unit 60 dependent upon the temperature of intake manifold 7.

The housing 61 of the valve unit 60 has a stepped central hole 62 and is screwed at one end into the water jacket 8 of the intake manifold 7. A temperature sensor section of the unit 60 comprises a cup-shaped hollow container 63 secured in one end of the hold 62, a diaphragm 64 extending across the cavity in container 63 and a wax element 65 filling the compartment enclosed by diaphragm 64 and the walls of container 63. Against the opposite side of the diaphragm 64 in the container 63 there is secured a guide sleeve 66. A push rod 67 is slidably disposed in the bore of sleeve 66 and carries at its free end a disc 68. Deflection of the diaphragm 64 is transmitted to the push rod 67 by means of a semifluid pressure transmitting medium 69 such as silicon grease. A sleeve 70 is disposed in hole 62 with one end telescoped over sleeve 66 and a smaller end back of diaphragm 64. Disc 68 is disposed against the internal wall of a shoulder formed where the larger and smaller portions of sleeve 70 meet. Spring 71 is compressed between a retainer ring 72 in hole 62 and the external wall of the shoulder on sleeve 70. Spring 71 is disposed about the smaller portion of sleeve 70. The push rod 67 may move sleeve 70 by pushing disc 68 against the shoulder of sleeve 70 and overcoming the force of spring 71. A spring 73 supported on the disc 68 and disposed in the sleeve 70 urges an actuator pin 74 outwardly through an opening in the end of sleeve 70. A check valve section of the unit 60 comprises a ball 75 as a valve member which remains displaced by a return spring 76 from the valve seat 77 formed at the shoulder of the stepped hole 62 thereby opening a communication for vacuum in the line 15.

When the temperature in the water jacket 8 has risen above a predetermined value, the wax element 65 begins to melt and to expand whereby the diaphragm 64 deflects rightwardly as viewed in FIG. 6. Upon deflection of the diaphragm 64 the push rod 67 causes the actuator pin 74 to move the ball 75 against the valve seat 77 so that the communication in the line 15 is now shut-off in the same manner as described in connection with FIG. 3.

In the additional fuel supply system of this invention as described above, a fuel feed system is provided between float bowl 6 and venturi tube 1 or intake manifold 7 separately from conventional systems. The fuel is fed into the fuel feed passages only at the time of acceleration when the engine is not sufficiently warmed up, thus eliminating engine troubles. On the other hand, when the engine is fully warmed up, a lean mixture is fed to the main system and, therefore, the costs for fuel are greatly decreased and the amount of CO and HC contained in exhaust gas can be effectively reduced. With engines in which fuel distribution by means of the manifold is not satisfactory, it becomes possible to feed fuel into the cylinders having lean mixture, thus eliminating engine troubles by preventing fuel distribution from becoming worse.

From the aforementioned, the construction of the system will be readily understood, and further explanation is believed unnecessary. However, since numerous modifications and changes will readily occur to those skilled in the art, it is to be understood that such modifications can be made without departing from the spirit and scope of the invention except as it may be limited by the claims.

What is claimed is:

1. In a system for supplying additional fuel to a fuel-air intake system when an internal combustion engine is accelerated, said system including a fuel source, means for supplying fuel into said intake system, a fuel pipe interconnecting said fuel source and said means, the improvement which comprises means for sensing engine temperature and an acceleration compensator for supplying fuel from said fuel source to said intake system through said fuel pipe and said means in response to changes in pressure in said intake system and comprising:

a diaphragm chamber;
 a diaphragm dividing said chamber into a first region and a second region, said first region being connected to said intake system, said second region having therein an inlet port connected to said fuel source through said fuel pipe and an outlet port connected to said intake system through said fuel pipe and said injecting means;
 a spring for biasing said diaphragm toward the minimum volume position of the second region;
 a check valve means normally closing said fuel pipe, said check valve means opening in response to increase in the volume of said second region to permit inflow from said fuel source to said second region and closing in response to decrease in volume to permit outflow from said second region to said injecting means;
 a temperature responsive means blocking expansion of said second region in response to increase of the engine temperature; and a second valve means for cutting off communication between said intake system and said first region, said second valve means being adapted to cut off the communication at the time the engine temperature is higher than a predetermined value.

2. The fuel supply system of claim 1 wherein said temperature sensing means comprises:
thermoelectric transforming means, said second valve means being operated by electric signals in response to output of said thermoelectric transforming means.

3. The fuel supply system of claim 2 wherein said thermoelectric transforming means comprises:
a thermoelectric detector; and
a circuit for judging whether the engine temperature is higher than said predetermined value, said circuit being adapted to output an electric signal when the engine temperature is higher than said predetermined value.

4. The fuel supply system of claim 3 wherein said second valve means comprises:
an electromagnetic valve, said electromagnetic valve being energized to cut off the communication between said intake system and said first region when said circuit outputs said signal.

5. The fuel supply system of claim 1 wherein the temperature sensing device comprises a cup-shaped housing, means for closing the normally open end of the housing, a rod disposed in the housing and extending outwardly therefrom into the said first region, a deformable member in the housing about the rod, and a meltable and expandable material in the housing about the deformable member, said rod being adapted to move in response to pressure from the deformable member and engage said diaphragm.

6. The fuel supply system of claim 1 wherein said controlling means comprises:
a stop for limiting the scope of moving of said diaphragm, the maximum volume of said second region being defined at the position where said diaphragm is in contact with said stop, said stop being adapted to shift the position thereof in response to the engine temperature.

7. The fuel supply system of claim 6 wherein said temperature sensing means comprises:
thermal expandable device disposed in a location where the engine temperature is sensed, said stop being adapted to shift the position thereof in response to the expansion of said thermal expandable device.

8. The fuel supply system of claim 7 wherein said thermal expandable device comprises:
a casing having a hole in a wall thereof; and
wax charged in said casing, said stop being inserted in said casing through said hole and pushed out in response to expansion of said wax as the engine temperature increases.

9. The fuel supply system of claim 1 wherein a valve having a bore therein, means for fluid connection of the bore to the compensator and means for fluid connection of the bore to the intake manifold, a third check valve in the bore between the said fluid connection means, means for biasing the third check valve into position for flow of fluid through the said fluid connection means and means responsive to temperature of the engine for closing said third check valve.

10. The fuel supply system of claim 9 wherein a cup-shaped housing is disposed in the said bore and is exposed to the temperature of the engine, a cavity in said housing, a diaphragm across the cavity, a material expandable with increase of temperature in the cavity and contacting the diaphragm, and means responsive to deflection of the diaphragm by expansion of the said material for closing said third check valve.

11. The fuel supply system of claim 10 wherein the means responsive to deflection of the diaphragm comprises a guide sleeve having a bore therethrough and disposed against the diaphragm, a body of semi-fluid in said bore adjacent the diaphragm, a rod slidably disposed in the bore in the sleeve, and biasing means compressed between the rod and check valve.

12. The fuel supply system of claim 10 wherein the means responsive to deflection of the diaphragm for closing the check valve comprises a housing spaced from the check valve in the bore, a diaphragm in the housing, a material expandable with temperature increase on one side of the diaphragm and in the housing, said housing being exposed to temperature change in the engine, a first sleeve having a bore therethrough and having one end abutting the opposite side of the diaphragm, a second sleeve having a section telescoped over said first sleeve and a second section of smaller cross-section with a shoulder therebetween, a piston slidably disposed in the bore of the first sleeve and having an end disposed against the said shoulder, a semi-fluid material in the bo-e of the first sleeve between the diaphragm and the piston, a spring compressed between the said shoulder and the third check valve and about the smaller section of the second sleeve, an actuator pin carried by the second sleeve and contacting a member of the third check valve, and a spring in the said second section biasing the said pin against the said member of the third check valve whereby expansion of the said expandable materials causes deflection of the diaphragm and movement of the piston, second sleeve and actuator pin against the third check valve and closes the third check valve against fluid flow therethrough.

13. The fuel supply system of claim 1 comprising a carburetor having a venturi tube, a float bowl and an accelerator pump for injecting fuel from the float bowl into the venturi tube.

14. The fuel system of claim 14 wherein said temperature responsive means comprises a cup-shaped housing disposed in the means for warming the intake manifold, said housing enclosing a chamber, means for closing the normally open end of the housing, a rod disposed in the chamber and extending into the first compartment in spaced relationship with the said diaphragm when the latter is not deflected towards the first compartment, an elastic deformable member about the rod in the chamber, and a material adapted to expand with increase in temperature about the elastic member and deform the elastic member and thereby move the rod towards the diaphragm to limit the deflection of the diaphragm.

15. The fuel supply system defined in claim 8 wherein said thermal expandable device further comprises:
an elastic member disposed in said casing, said wax being charged between said casing and said elastic member, said stop being inserted in said elastic member.

16. The fuel system of claim 13 wherein said accelerator pump comprises a cylinder disposed in the float bowl, a piston comprising a cup-shaped member slidably disposed in the cylinder, means for biasing the cup-shaped member towards one end of the cylinder, a throttle valve, a lever connecting the throttle valve with the piston for actuation of the piston in response to depression of an accelerator pedal, and an injection passageway between the cylinder and the venturi tube.

* * * * *